(12) United States Patent
Schumacher et al.

(10) Patent No.: US 7,417,193 B2
(45) Date of Patent: Aug. 26, 2008

(54) PROTECTIVE JACKET COVER FOR KEYLESS REMOTES

(76) Inventors: Roger Schumacher, 10220 Corby St., #108, Omaha, NE (US) 68134; Ryan Leuschen, 10912 Manderson Plaza, Omaha, NE (US) 68164

( * ) Notice: Subject to any disclaimer, the term of this patent is extended or adjusted under 35 U.S.C. 154(b) by 359 days.

(21) Appl. No.: 11/365,421

(22) Filed: Mar. 1, 2006

(65) Prior Publication Data
US 2007/0044997 A1    Mar. 1, 2007

Related U.S. Application Data

(60) Provisional application No. 60/711,321, filed on Aug. 25, 2005.

(51) Int. Cl.
*H01B 7/00* (2006.01)
(52) U.S. Cl. ............... 174/135; 206/305; 206/37; 206/37.1; 70/456 R
(58) Field of Classification Search ............... 174/135, 174/50, 66, 67; 220/241, 242; 206/305, 206/37, 37.1; 70/456 R; D3/208
See application file for complete search history.

(56) References Cited

U.S. PATENT DOCUMENTS

| 5,388,691 | A | * | 2/1995 | White | 206/305 |
| 5,850,754 | A | * | 12/1998 | Dobbins | 70/456 R |
| D448,157 | S | * | 9/2001 | Wright | D3/208 |
| 6,669,017 | B2 | * | 12/2003 | Linihan | 206/305 |
| 6,852,929 | B2 | * | 2/2005 | Scudder | 174/66 |
| 6,948,614 | B1 | * | 9/2005 | Hall et al. | 206/305 |

* cited by examiner

*Primary Examiner*—Angel R Estrada

(57) ABSTRACT

A protective jacket cover for keyless remotes includes a hollow body formed of a semi-flexible, resiliently deformable sheet material having a front wall, rear wall, side walls, base wall and top wall and at least one button access opening formed on the front wall. A transverse slit is formed in the base wall of the body which extends across a substantial part of the base wall generally parallel with the front wall, the transverse slit being expandable and distendable to permit insertion of a keyless remote into the body of the protective jacket cover. An outwardly extending key ring engagement structure is mounted on the top wall which includes top and bottom key ring holes to engage and cover the key ring hole and key ring mounting portion of a keyless remote whereby additional securement for the protective jacket cover on a keyless remote is provided.

11 Claims, 2 Drawing Sheets

PROTECTIVE JACKET COVER FOR KEYLESS REMOTES

CROSS-REFERENCE TO RELATED PROVISIONAL PATENT

This application claims priority based on a provisional patent, specifically on the Provisional Patent Application Serial No. 60/711,321 filed Aug. 25, 2005.

BACKGROUND OF THE INVENTION

1. Technical Field

The present invention relates to protective covers for key fobs and, more particularly, to a protective jacket cover for a keyless remote which includes a body which is shaped generally similar to the remote on which it is to be fitted and which includes a back wall, side walls, a front wall, and top and base walls, the front wall including at least one opening through which access to the keyless remote housed therein is permitted, the base wall including a deformable and expandable slit formed extending transversely across the base wall to permit the keyless remote to be slid into the protective jacket cover and the top wall including an upwardly projecting key ring engagement structure into which the key ring engagement portion of the keyless remote may extend such that the key ring may be extended through the protective jacket cover, through the keyless remote and back out through the protective cover jacket to further secure the protective jacket cover on the keyless remote.

2. Description of the Prior Art

There has been explosive growth in recent years in the number and types of keyless entry devices which have been devised for use in connection with automobiles and SUVs. These include devices such as keypads located on the vehicle itself which permit a code to be entered to open the locking system of the vehicle and various proximity-type devices which permit unlocking of the vehicle and engagement of the vehicle engine when the unlocking device comes into close proximity with the vehicle. By far the most common type of keyless remote entry device, however, is the key fob device which includes a transmitter and a plurality of function buttons, most commonly including a lock button, unlock button, a panic button and a trunk button, although many different combinations of function buttons are used in connection with the keyless remote key fobs currently being produced. In general, however, these keyless remotes include a generally rectangular, triangular or ovoid plastic body having top and bottom plates snap-fitted to one another with the plurality of function buttons mounted on the top plate, the keyless remote further including a key ring opening through which a key ring can be extended for supporting the vehicle keys thereon.

One of the significant problems encountered with these keyless remote devices, however, is that the plastic construction material often chips, cracks or gets scratched, thus rendering the keyless remote damaged or, at the very least, unsightly. Furthermore, because virtually all keyless remotes are constructed by the vehicle manufacturers, they all are similar in appearance, usually including a black plastic body and gray and red function buttons, and thus everyone's keyless remote has virtually identical appearances, particularly for like automobiles. While this may not ordinarily present a significant problem, in situations where multiple sets of keys are stored together, it can become a tiresome and time-consuming process to sort out whose keys are whose. There is therefore a need for a protective and decorative jacket cover for keyless remote devices which may be quickly and easily used with keyless remote devices as thus described.

Therefore, an object of the present invention is to provide a protective jacket cover for keyless remotes which will protect keyless remotes housed therein.

Another object of the present invention is to provide a protective jacket cover for keyless remotes which is usable with a wide variety of keyless remotes for all types of vehicles including automobiles, trucks, motorcycles, ATVs, aircraft, watercraft including boats and personal water vehicles and any other type of vehicle which utilizes a keyless remote.

Another object of the present invention is to provide a protective jacket cover for keyless remotes which securely mounts on the keyless remote by frictional contact, reclosing of the protective jacket cover after insertion of the keyless remote therein and through insertion of a key ring through the key ring engagement structure of the protective jacket cover thereby making it highly unlikely that the protective jacket cover will accidentally fall off the keyless remote.

Another object of the present invention is to provide a protective jacket cover for keyless remotes which is formed as a single integral unit which does not require additional closure devices to secure the keyless remote therewithin.

Another object of the present invention is to provide a protective jacket cover for keyless remotes which will enhance the aesthetic appearance of the keyless remote while simultaneously protecting the keyless remote.

Finally, an object of the present invention is to provide a protective jacket cover for keyless remotes which is relatively simple and durable in manufacture and is safe, effective, and efficient in use.

SUMMARY OF THE INVENTION

The present invention provides a protective jacket cover for keyless remotes including a hollow body formed of a semi-flexible, resiliently deformable sheet material having a front wall, rear wall, side walls, base wall and top wall and at least one button access opening formed on the front wall. A transverse slit is formed in the base wall of the body which extends across a substantial part of the base wall generally parallel with the front wall, the transverse slit being expandable and distendable to permit insertion of a keyless remote into the body of the protective jacket cover for retention of the keyless remote therein. Finally, an outwardly extending key ring engagement structure is mounted on the top wall which includes top and bottom key ring holes to engage and cover the key ring hole and key ring mounting portion of a keyless remote when the keyless remote is slid into the body of the protective jacket cover whereby additional securement for the protective jacket cover on a keyless remote is provided.

As thus described, the protective jacket cover for keyless remotes pad of the present invention provides numerous advantages over those key covers and key fobs found in the prior art. For example, because the protective jacket cover is formed as a single integrally formed unit and does not require additional closure devices to secure the keyless remote therewithin, use of the device is far easier and far more secure than other devices in the prior art. Furthermore, because protective jacket cover secures on the keyless remote via frictional contact, reclosing of the transverse slit and through insertion of the key ring through the key ring engagement structure, it is highly unlikely that the protective jacket cover will accidentally fall off the keyless remote. Finally, because the present invention may be used in connection with many different types of keyless remotes, merely by changing the shape of the body of the protective jacket cover, it is useable by virtually anyone owning a keyless remote, and this universality is not found in those devices disclosed in the prior art. The protective jacket cover for keyless remotes of the present invention thus provides a substantial improvement over those key covers and key fobs found in the prior art.

DESCRIPTION OF THE PREFERRED EMBODIMENT

Figure 1:
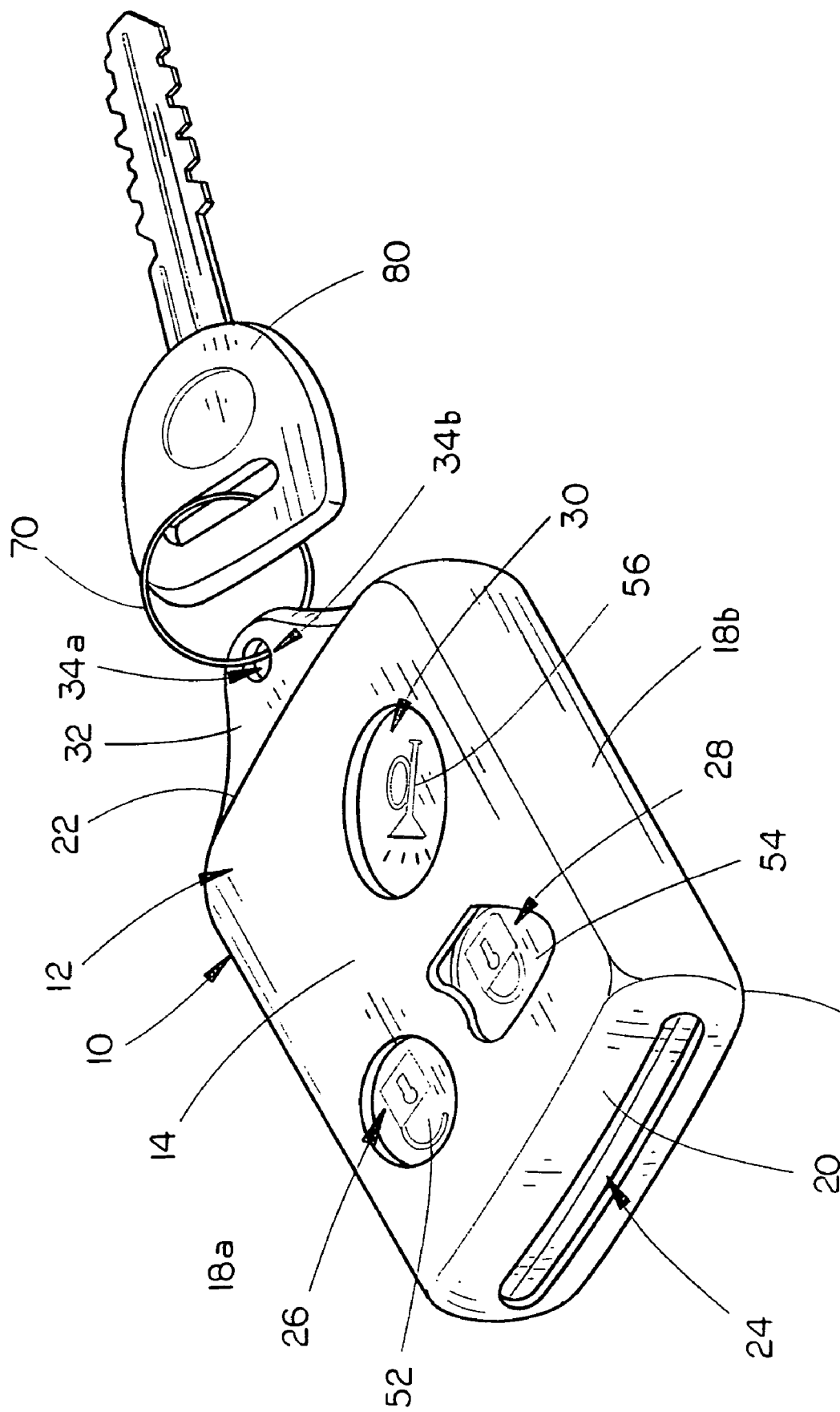
FIG. 1 is a perspective view of the protective jacket cover of the present invention fitted onto a keyless remote.
Figure 3:
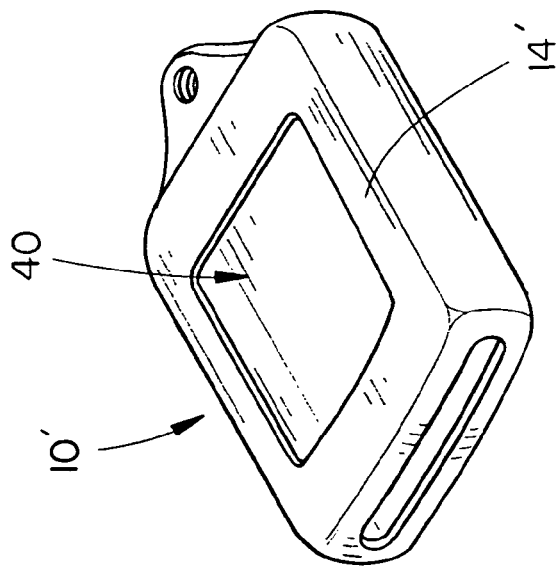
FIG. 3 is a perspective view of an alternative embodiment of the protective jacket cover of the present invention.
Figure 2:
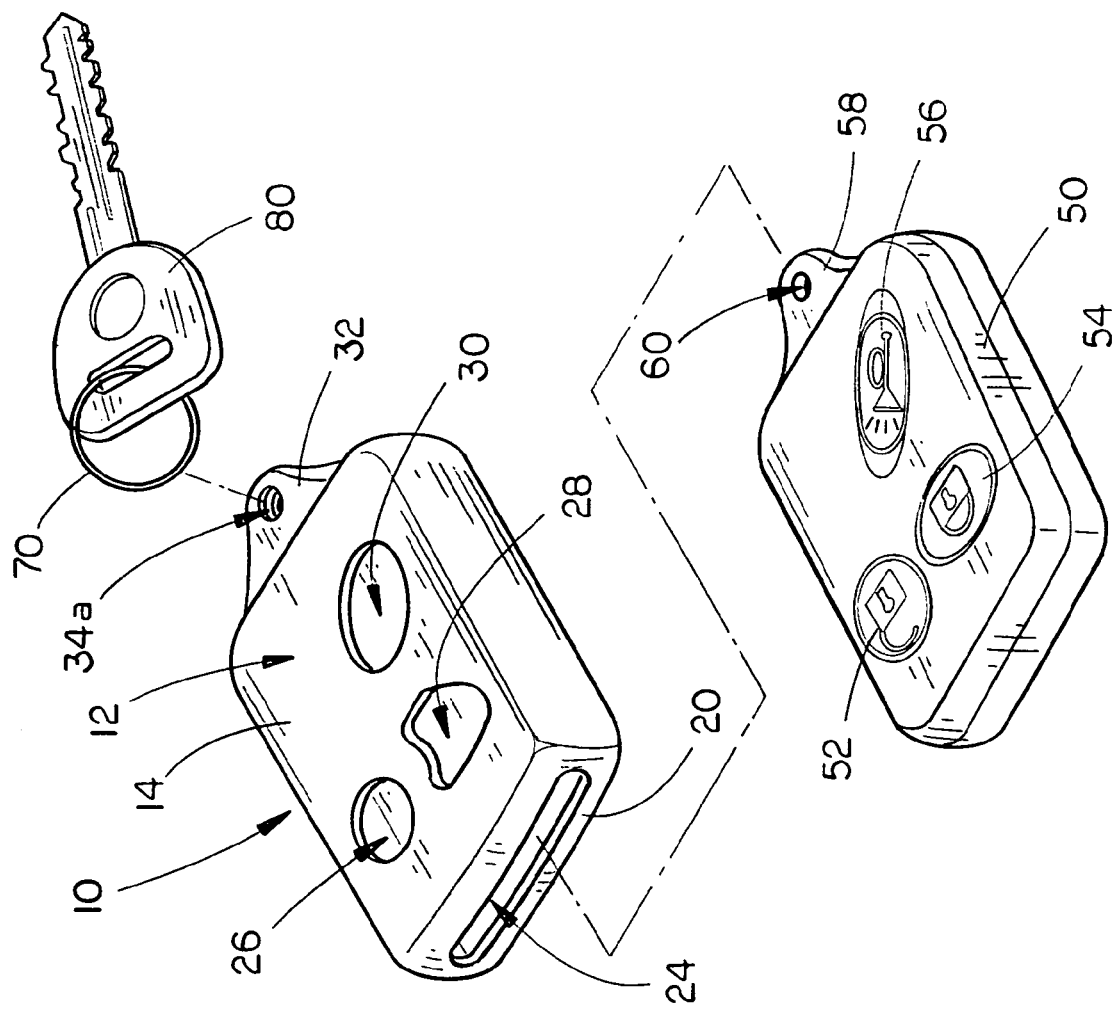
FIG. 2 is a detailed perspective view of the present invention showing how the keyless remote fits into the protective jacket cover.

The protective jacket cover 10 of the present invention is shown best in FIGS. 1-3 as including a generally rectangular body 12 having a front wall 14, rear wall 16, side walls 18a and 18b, base wall 20, and top wall 22. In the preferred embodiment, the body 12 would have dimensions approximately equal to the keyless remote 50 over which the body 12 is to be fitted, whether it is rectangular, triangular, circular or ovoid in shape, and the body 12 would preferably be constructed of a plastic or a food-grade silicone rubber material which is semi-flexible, resiliently deformable, and is durable and wear-resistant. Any of the standard types of construction methods may be used in connection with the body 12, such as injection molding, lost wax molding, or other such plastic and rubber forming and construction methods, any of which would be understood by one skilled in the art of production of plastic or rubber molded items. Also, it should be noted that the body 12 may be constructed of leather, fabric or any other flexible and durable material, depending on the desires of the manufacturer of the present invention and the purchasing choices of the purchasing public.

As shown best in FIGS. 1 and 2, front wall 14 would include a plurality of button access openings 26, 28, and 30 which would be positioned on front wall 14 to generally correspond with the positions of the function buttons 52, 54, and 56 located on the keyless remote 50 when the keyless remote 50 is housed within body 12 of protective jacket cover 10. Of course, the size, shape and number of button access openings 26, 28, and 30 may be modified or changed depending on the number of function buttons 52, 54, and 56 found on the keyless remote 50 and their exact positioning on the keyless remote 50, and such modifications would be clearly indicated based on visual inspection of the keyless remote 50. Furthermore, because of the numerous types of keyless remotes 50 which are currently manufactured and used in connection with automobiles and SUVs, it may be preferable to provide an alternative embodiment of the protective jacket cover 10' of the present invention such as that shown in FIG. 3.

This embodiment would preferably include a front wall 14 having a generally rectangular button access opening 40 which is large enough to permit access to each of the function buttons 52, 54, and 56 found on the keyless remote 50 when the keyless remote 50 is placed within the body 12' of the protective jacket cover 10' of FIG. 3, regardless of the exact configuration of the function buttons 52, 54, and 56. The embodiment of FIG. 3 is thus a more "universal" type of protective jacket cover 10' which may be used with many different types of keyless remotes 50. Of course, the precise size and shape of the button access opening 40 of the embodiment of FIG. 3 may be modified or changed to accommodate various designs of keyless remotes 50, and such modifications and changes should be understood to be a part of this disclosure.

Two very important features of the protective jacket cover 10 of the present invention are shown best in FIGS. 1 and 2, namely, how the protective jacket cover 10 is placed upon the keyless remote 50 and the additional securement connection which secures the protective jacket cover 10 on the keyless remote 50, operating in addition to the frictional contact between the protective jacket cover 10 and keyless remote 50. Specifically, base wall 20 of body 12 would include a transverse slit 24 which extends generally parallel with the plane of front wall 14, as shown best in FIGS. 1 and 2. The transverse slit 24 would preferably be in the shape of an elongated rounded rectangle and, due to the semi-flexible and resiliently deformable nature of the construction material of body 12, the transverse slit 24 may be expanded and distended to permit the keyless remote 50 to be slid into the body 12 of protective jacket cover 10 through the transverse slit 24. Once the keyless remote 50 is housed within the body 12 of protective jacket cover 10, the transverse slit 24 is released and substantially closes due to the resilience of the construction materials, thus releasably securing the keyless remote 50 within the protective jacket cover 10. Also, the transverse slit 24 may extend partially into side walls 18a and 18b should such extension prove necessary to permit the proper distention of the transverse slit 24 to fit the body 12 of protective jacket cover 10 onto the keyless remote 50, although such a design is not currently necessary for proper functioning of the present invention. However, it has been found that the transverse slit 24 may, over time, gradually open due to the natural loss of resiliency of the construction material. Therefore, there is a need for an additional connection between the keyless remote 50 and protective jacket cover 10 to ensure that the protective jacket cover 10 remains on the keyless remote 50, thus providing protection therefor.

This is accomplished by including an outwardly extending key ring engagement structure 32 mounted on top wall 22, as shown best in FIGS. 1 and 2, into which the key ring attachment portion 58 of keyless remote 50 extends when the keyless remote 50 is placed within protective jacket cover 10. In ordinary embodiments of the keyless remote 50, the key ring mounting portion 58 includes a key ring hole 60 through which a key ring 70 may be extended in order to releasably secure the vehicle key 80 to the keyless remote 50. The present invention takes advantage of this connection by including the key ring engagement structure 32 which further includes top and bottom key ring holes 34a and 34b which concentrically align with the key ring hole 60 and key ring mounting portion 58 of keyless remote 50 when the keyless remote 50 is placed within the body 12 of the protective jacket cover 10, as shown best in FIG. 1. The key ring 70 may then extend through the key ring holes 34a and 34b and through key ring hole 60 in keyless remote 50, thus providing additional securement for the protective jacket cover 10 on keyless remote 50. Although it is generally believed that frictional contact between the protective jacket cover 10 and keyless remote 50 and the resilient closing of the transverse slit 24 will be sufficient to retain the protective jacket cover 10 on the keyless remote 50, the additional securement provided by the engagement of key ring mounting portion 58 with key ring engagement structure 32 of protective jacket cover 10 ensures that the protective jacket cover 10 will remain on the keyless remote 50 even under adverse circumstances.

One additional feature of the protective jacket cover 10 of the present invention is that it may be constructed to include various colors, designs, and other ornamental features on the external surface thereof which improves the aesthetic appearance of the protective jacket cover 10 and hence the keyless remote 50 when the keyless remote 50 is housed within the protective jacket cover 10. Virtually any type of design or color may be imprinted on the outer surface of the protective jacket cover 10 to enhance the appearance of the keyless remote 50 and thus personalize the keyless remote 50, a feature not currently found in connection with other devices found in the prior art. The importance of the ability of an individual to personalize his or her keyless remote 50 by incorporating a selected protective jacket cover 10 cannot be underestimated, for both identification and decorative purposes, and it is thus believed that the present invention provides a substantial improvement over those related devices found in the prior art.

Additionally, there are other types of key fobs which are currently being used by automobile manufacturers, such as ones which include the key built into the key fob, and slight modification of the shape and design of the present invention will permit the present invention to be used with such key fob/key combinations. Such modifications would be understood by one skilled in the art of manufacturing the present invention, and should be understood to be a part of this disclosure and within the scope of the present invention.

It is to be understood that numerous additions, substitutions and modifications may be made to the protective jacket cover 10 of the present invention which fall within the intended broad scope of the above description. For example, the size, shape, and construction materials used in connection with the body 12 of protective jacket cover 10 may be modified or changed so long as the important protective and appearance-improving characteristics of the protective jacket cover 10 are maintained. Furthermore, the size, shape, position and number of button access openings 26, 28, and 30 may be modified or changed depending on the type of keyless remote 50 being housed within the protective jacket cover 10, and, in fact, as was discussed previously, a generic button access opening 40, such as that shown in the embodiment of FIG. 3, may be incorporated in the present invention to permit the protective jacket cover 10 to be used in connection with a variety of keyless remotes 50 having dimensions which are similar but include additional or different function buttons. Finally, the precise size and extent of the transverse slit 24 within base wall 20 may be modified or changed and, in fact, the transverse slit may be moved to one or the other of side walls 18a and 18b so long as the intended purpose of permitting the keyless remote 50 to be slid into the protective jacket cover 10 and be releasably retained therein is maintained.

There has therefore been shown and described a protective jacket cover 10 for keyless remotes which accomplishes at least all of its intended purposes.

We claim:

1. A protective jacket cover for keyless remotes comprising:
   a hollow body formed of a semi-flexible, resiliently deformable sheet material having at least a front wall, a base wall and a top wall;
   at least one button access opening formed on said front wall;
   a transverse slit formed in said base wall of said body and extending across a substantial part of said base wall generally parallel with said front wall, said transverse slit being resiliently expandable and distendable to permit insertion of a keyless remote into said body of said protective jacket cover for retention of the keyless remote therein; and
   an outwardly extending key ring engagement structure mounted on said top wall including top and bottom key ring holes to engage and cover the key ring hole and key ring mounting portion of a keyless remote when the keyless remote is slid into said body of said protective jacket cover whereby additional securement for said protective jacket cover on a keyless remote is provided.

2. The protective jacket cover for keyless remotes of claim 1 wherein said hollow body is constructed of one of a plastic and a silicone rubber material.

3. The protective jacket cover for keyless remotes of claim 1 wherein said at least one button access opening comprises a plurality of button access openings positioned to generally correspond with the positions of the function buttons located on the keyless remote when the keyless remote is housed within said hollow body of said protective jacket cover.

4. The protective jacket cover for keyless remotes of claim 1 wherein said transverse slit has an elongated rounded rectangle shape and, upon the keyless remote being slid into said hollow body of said protective jacket cover through said expanded and distended transverse slit, said transverse slit resiliently returns to its pre-expanded shape thereby releasably securing the keyless remote within said protective jacket cover.

5. The protective jacket cover for keyless remotes of claim 1 wherein said outwardly extending key ring engagement structure is generally pyramidal in shape.

6. The protective jacket cover for keyless remotes of claim 1 wherein said outwardly extending key ring engagement structure is generally arcuate in shape.

7. A protective jacket cover for keyless remotes comprising:
   a hollow body formed of a semi-flexible, resiliently deformable sheet material having at least a front wall, rear wall, side walls, base wall and top wall;
   at least one button access opening formed on said front wall to generally correspond with and permit access to the function buttons on a keyless remote when a keyless remote is housed within said body;
   a transverse slit formed in said base wall of said body and extending across a substantial part of said base wall generally parallel with said front wall, said transverse slit expandable and distendable to permit a keyless remote to be slid therethrough into said body of said protective jacket cover; and
   an outwardly extending generally pyramidal key ring engagement structure mounted on said top wall into which the key ring attachment portion of a keyless remote extends when the keyless remote is slid into the protective jacket cover, said key ring engagement structure further including top and bottom key ring holes which concentrically align with the key ring hole and key ring mounting portion of a keyless remote when the keyless remote is slid into said body of said protective jacket cover, a key ring then being extendable through said key ring holes and through the key ring hole in a keyless remote whereby additional securement for said protective jacket cover on a keyless remote is provided.

8. The protective jacket cover for keyless remotes of claim 7 wherein said hollow body is constructed of one of a plastic and a rubber material.

9. The protective jacket cover for keyless remotes of claim 7 wherein said at least one button access opening comprises a plurality of button access openings positioned to generally correspond with the positions of the function buttons located on the keyless remote when the keyless remote is housed within said hollow body of said protective jacket cover.

10. The protective jacket cover for keyless remotes of claim 7 wherein said transverse slit has an elongated rounded rectangle shape and, upon the keyless remote being slid into said hollow body of said protective jacket cover through said expanded and distended transverse slit, said transverse slit resiliently returns to its pre-expanded shape thereby releasably securing the keyless remote within said protective jacket cover.

11. In combination:
   a keyless remote including a body, a key ring mounting structure and key ring hole formed on a top wall of said keyless remote, a transmitting device mounted within said body and at least one function button on a front wall of said body for operating said transmitting device and a key ring extendable through said key ring hole; and
   a protective jacket cover for keyless remotes including;
      a hollow body formed of a semi-flexible, resiliently deformable sheet material having a front wall, a rear wall, side walls, base wall and top wall;
      at least one button access opening formed on said front wall;
      a transverse slit formed in said base wall of said body and extending across a substantial part of said base wall generally parallel with said front wall, said transverse slit being resiliently expandable and distendable to permit insertion of said keyless remote into said body of said protective jacket cover for retention of said keyless remote therein; and
      an outwardly extending key ring engagement structure mounted on said top wall including top and bottom key ring holes to engage and cover said key ring hole and said key ring mounting portion of said keyless remote when said keyless remote is slid into said body of said protective jacket cover with said key ring extending through said key ring engagement structure, said key ring hole and said top and bottom key ring holes whereby additional securement for said protective jacket cover on said keyless remote is provided.

* * * * *